US011570126B2

(12) United States Patent
Yuki

(10) Patent No.: US 11,570,126 B2
(45) Date of Patent: Jan. 31, 2023

(54) SYSTEM, CLIENT TERMINAL, CONTROL METHOD, AND STORAGE MEDIUM

(71) Applicant: CANON KABUSHIKI KAISHA, Tokyo (JP)

(72) Inventor: Naoto Yuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 16/810,732

(22) Filed: Mar. 5, 2020

(65) Prior Publication Data

US 2020/0287848 A1    Sep. 10, 2020

(30) Foreign Application Priority Data

Mar. 8, 2019 (JP) .............................. JP2019-042587

(51) Int. Cl.
*H04L 49/90* (2022.01)
*H04L 9/40* (2022.01)
*H04L 47/26* (2022.01)

(52) U.S. Cl.
CPC .......... *H04L 49/90* (2013.01); *H04L 63/0876* (2013.01); *H04L 63/108* (2013.01); *H04L 47/26* (2013.01)

(58) Field of Classification Search
CPC ... H04L 63/0892; H04L 49/90; H04L 63/108; H04L 47/26; H04L 47/263; H04L 63/0876; H04L 63/0823
See application file for complete search history.

(56) References Cited

U.S. PATENT DOCUMENTS

| 2008/0031139 | A1* | 2/2008 | Muro | H04L 67/101 370/237 |
| 2013/0279339 | A1* | 10/2013 | Ibuki | H04L 47/11 370/236 |
| 2016/0261481 | A1* | 9/2016 | Ogata | H04L 43/10 |
| 2018/0040215 | A1* | 2/2018 | Jackson | G08B 25/009 |
| 2018/0152518 | A1* | 5/2018 | Lee | G06F 9/505 |
| 2018/0227649 | A1* | 8/2018 | Corbin | H04W 84/22 |
| 2019/0066402 | A1* | 2/2019 | Unagami | H04L 63/123 |

FOREIGN PATENT DOCUMENTS

JP    2016-163242 A    9/2016

* cited by examiner

*Primary Examiner* — Oussama Roudani
(74) *Attorney, Agent, or Firm* — Canon U.S.A., Inc. I.P. Division

(57) ABSTRACT

A reception service system transmits a first transmission rule to a predetermined client terminal among a plurality of client terminals in a case where an amount of data transmitted from the predetermined client terminal per unit time exceeds a predetermined value. Each of the plurality of client terminals transmits data about an event that has occurred at that client terminal to the reception service system, and stores the first transmission rule transmitted from the reception service system. The client terminal does not transmit at least some of the data about the event that has occurred at the client terminal so that the amount of data transmitted per unit time does not exceed the predetermined value according to the first transmission rule.

7 Claims, 13 Drawing Sheets

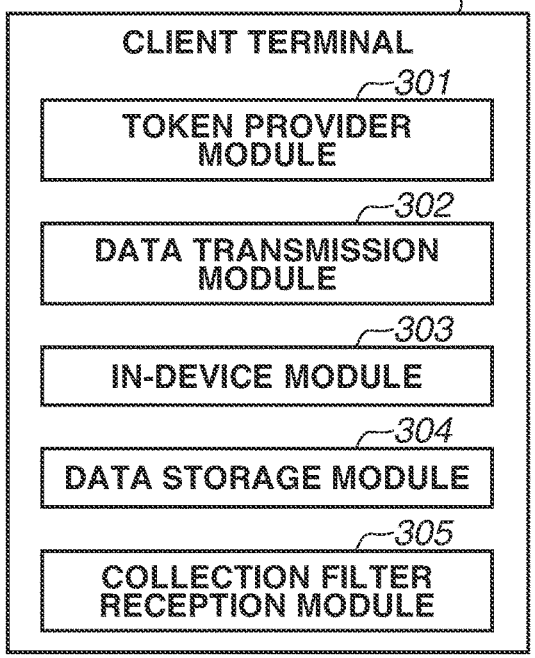
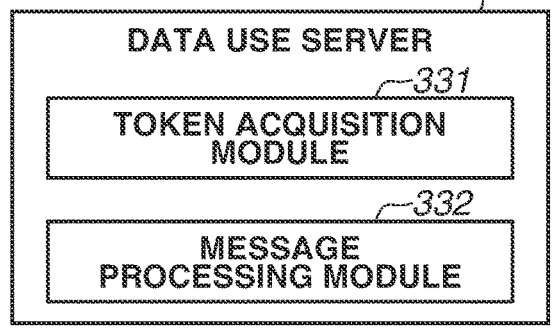
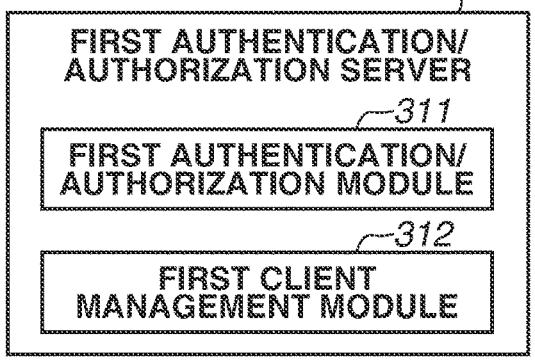
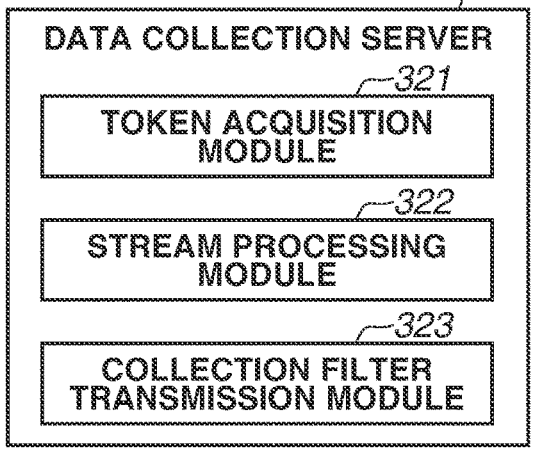
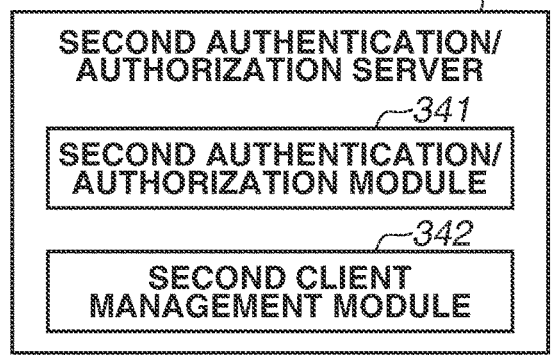
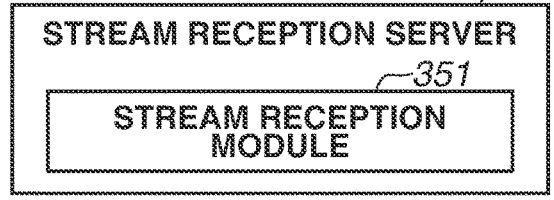
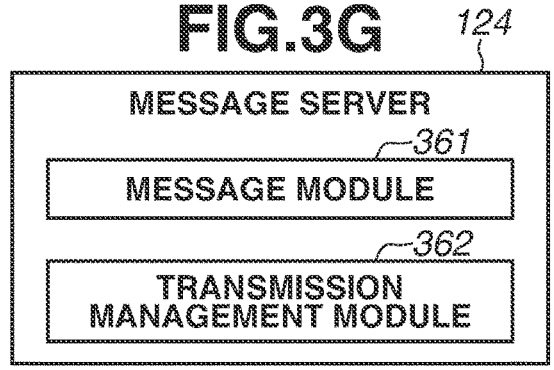
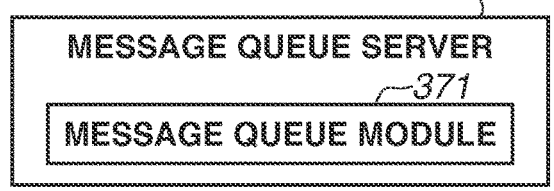

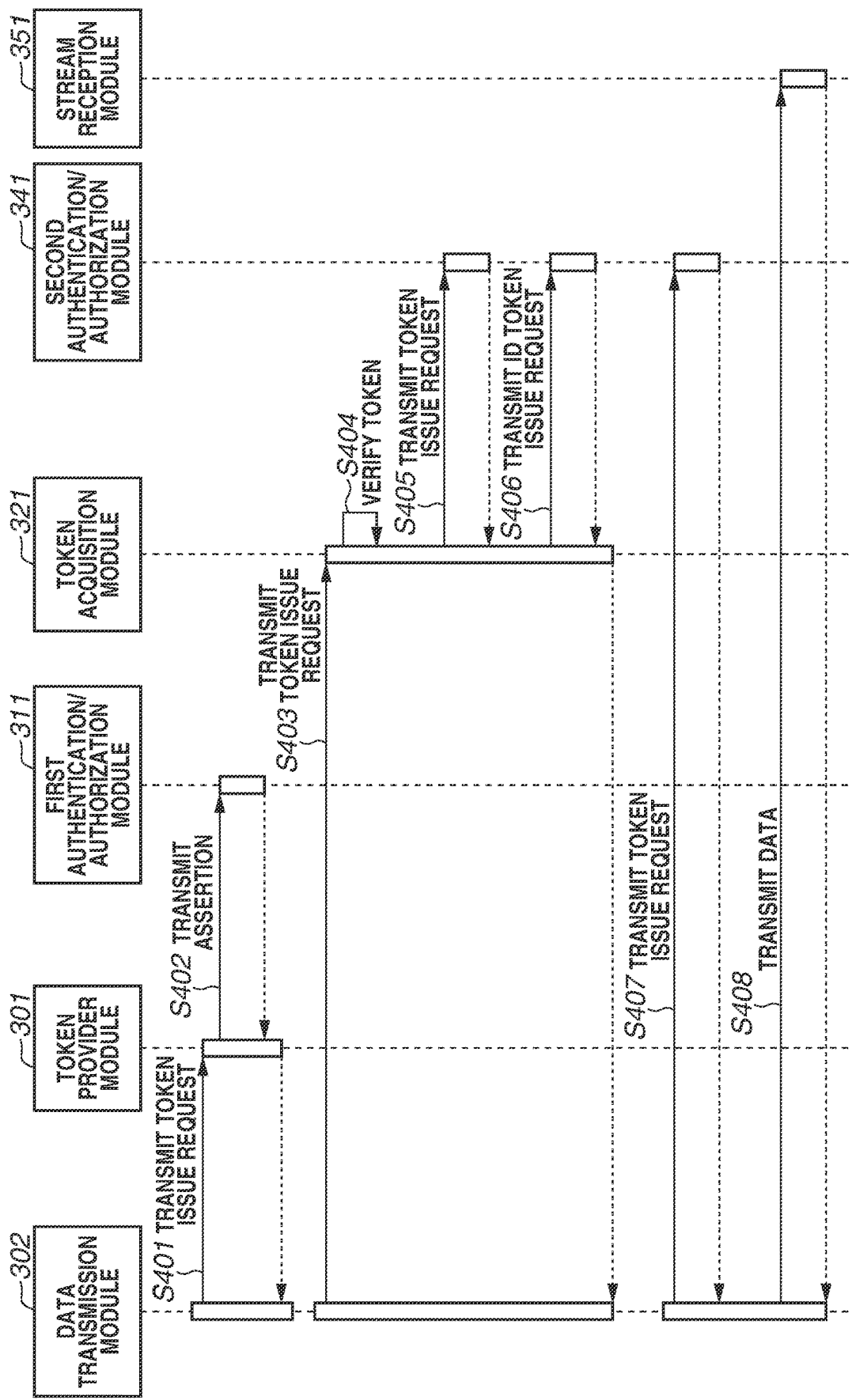

FIG.6A

```
{
    "collections" : [
        {
            "entity": "HDD",                      ~602
            "eventName": "sensorError",           ~603
            "fire": "10min",                      ~604
            "collectionFilterMode": "normal"      ~605
        }
        {
            "entity": "Print",
            "eventName": "jobStart",
            "fire": "1min",
            "collectionFilterMode": "normal"
        }
    ]
}
```

FIG.6B

```
{
    "collections": [
        {
            "entity": "HDD",                      ~602
            "eventName": "sensorError",           ~603
            "fire": "60min",                      ~604
            "collectionFilterMode": "safe",       ~605
            "threshold": 5                        ~606
        }
        {
            "entity": "Print",
            "eventName": "jobStart",
            "fire": "1min",
            "collectionFilterMode": "normal"
        }
    ]
}
```

FIG.7A

```
{
        "id": "1235465423",         ~702
        "deviceSerial": "AAA12345", ~703
        "entity": "HDD",            ~704
        "eventName": "sensorError", ~705
706~    "occurDateTime":2018/08/31 00:00:01
}
}
```

```
{
    "event": {
            "id": "1235465423",         ~702
            "deviceSerial": "AAA12345", ~703
            "entity": "HDD",            ~704
            "eventName": "sensorError", ~705
706~        "occurDateTime":2018/08/31 00:00:01,
            "safeMode": "release"       ~707
    }
}
```

701

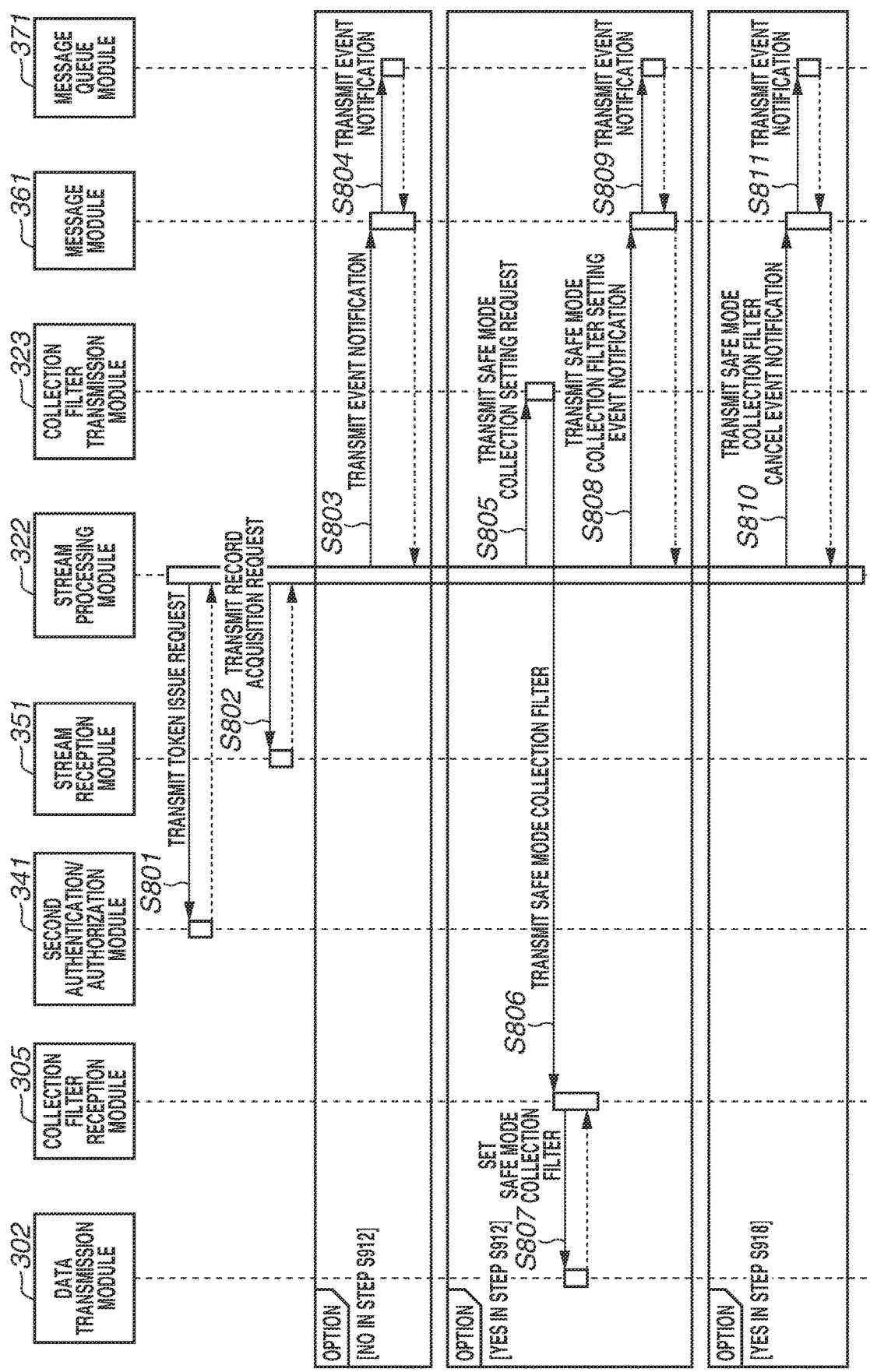

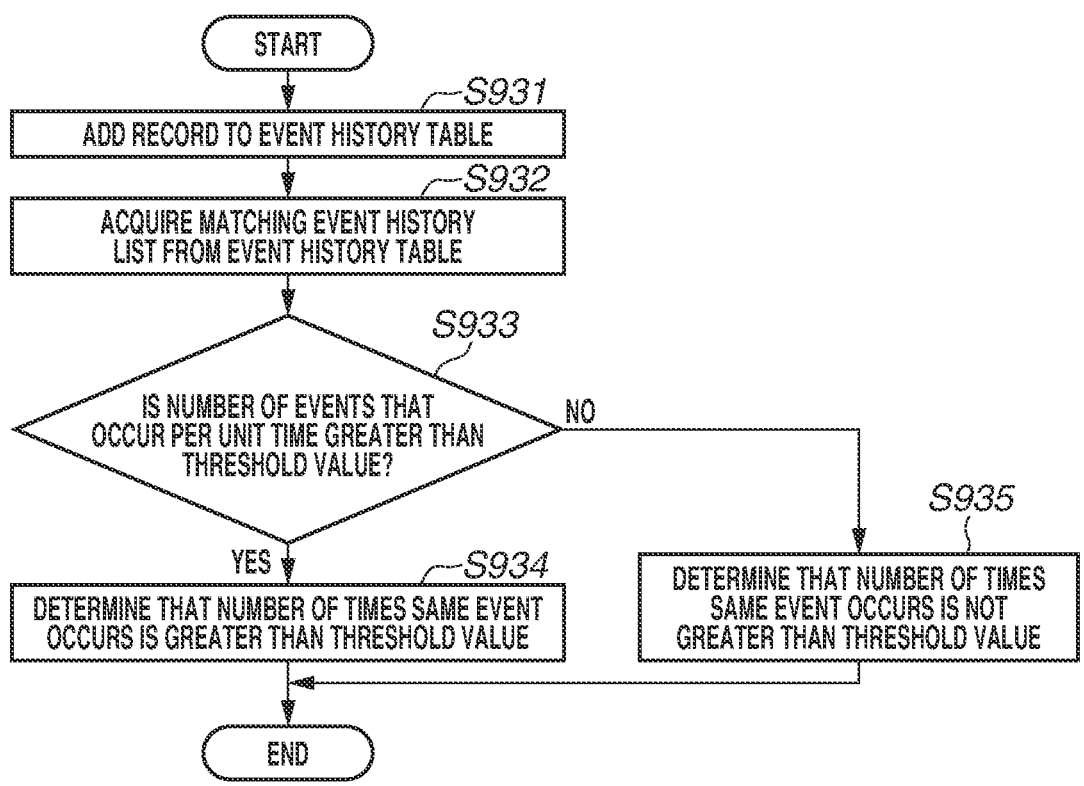

FIG.12
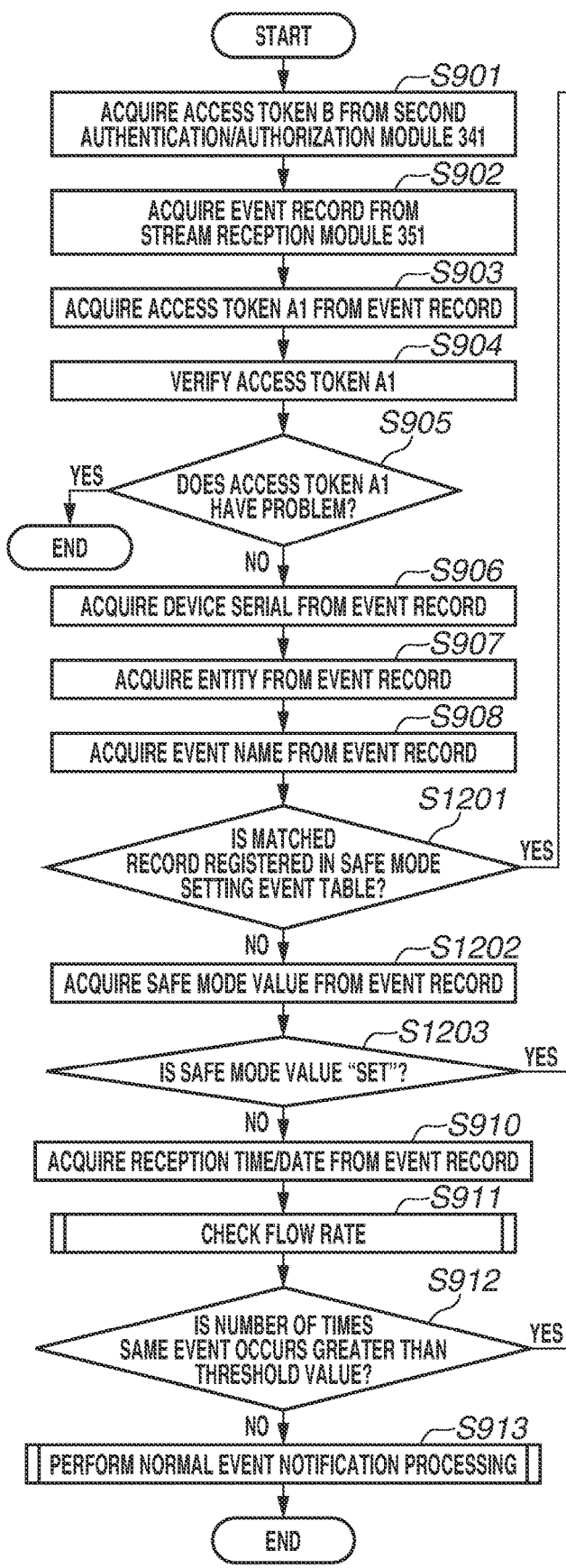
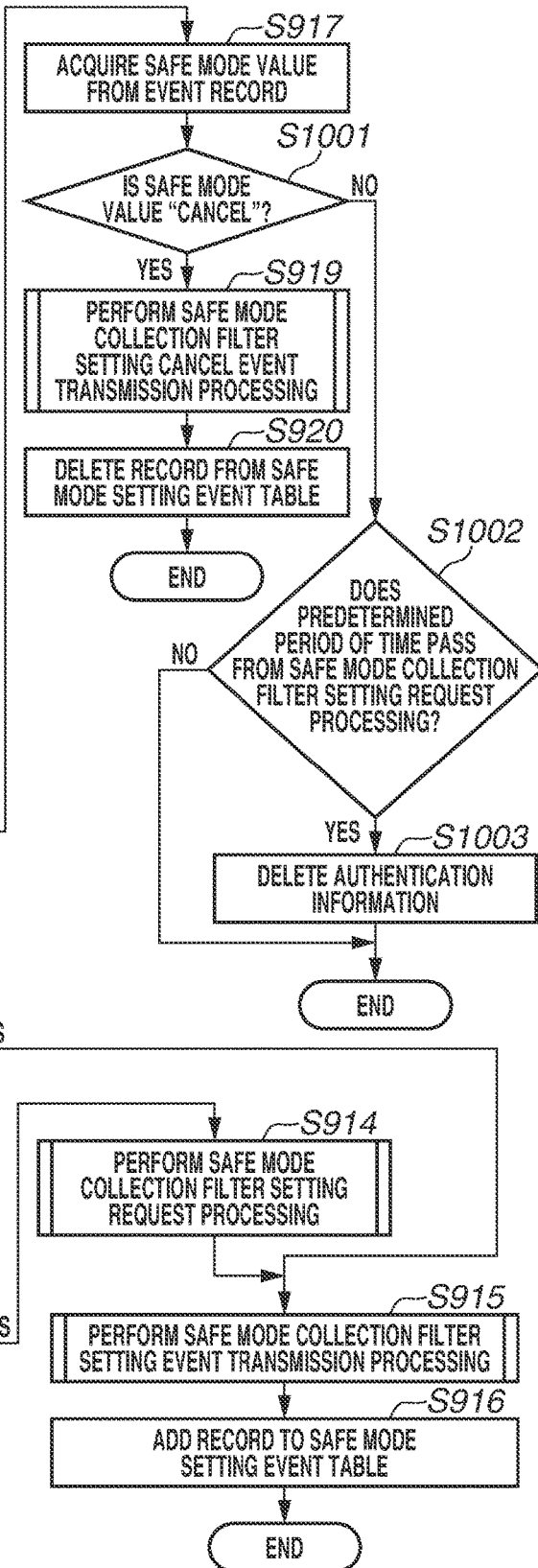

SYSTEM, CLIENT TERMINAL, CONTROL METHOD, AND STORAGE MEDIUM

BACKGROUND

Field of the Disclosure

The present disclosure relates to a system that includes a plurality of client terminals and a reception service system, a client terminal, a control method, and a storage medium.

Description of the Related Art

In these days, systems that realize "Internet of Things" (hereinafter, referred to as "IoT") are used. IoT connects home appliances and automobiles to the Internet. Further, the multi-functionalization of an image forming apparatus has advanced, and a multi-function peripheral (hereinafter, referred to as "MFP") can now operate as an IoT client.

An IoT system collects a large amount of data, such as sensor information about sensors connected to IoT clients (also referred to simply as "clients"), and analyzes the collected data to provide a service and an added value to the IoT clients and users of the IoT clients. In the IoT system, the large amount of data is received from a large number of clients.

In the processing of receiving a large amount of data in real time, it is important to monitor traffic that changes at every moment. With a conventional resource server with an application programming interface (API) alone, it is difficult to monitor such traffic. Thus, it is becoming common to use a dedicated service (reception service) for data reception to collect data while separating the processing of providing a service (resource service) as asynchronous processing.

The IoT client transmits data to a reception service, and the reception service buffers the received data and supplies the buffered data in response to a data reception request from a resource service. In this way, the resource service can focus on data processing without being conscious of a huge amount of varying traffic from the IoT client.

Further, there can be a plurality of resource services to which data is transferred from a stream reception service. Since each resource service executes processing asynchronously with the stream reception service, a resource service can be added flexibly for each type of service to be provided in IoT system development.

Japanese Patent Application Laid-Open No. 2016-163242 discusses a data collection system in which a server configured to receive sensor data output from a monitoring target sensor from a gateway performs processing based on the sensor data to predict a malfunction of the monitoring target. In a case where the server detects an abnormality or a sign of an abnormality in the monitoring target, a collection rule for increasing the types of sensor data to be collected and the collection frequency is transmitted to the gateway.

However, the amount of resources in the reception service that executes data processing is limited. Thus, if a large amount of data is transmitted at a higher frequency than a normal frequency from a client, a delay in processing of data from another normal client may occur at the reception service.

SUMMARY

The present disclosure is directed to a system capable of preventing a delay in data processing of a client in a reception service in a case where a large amount of data is transmitted from a predetermined client.

According to an aspect of the present disclosure, a system including a plurality of client terminals and a reception service system configured to receive data from the plurality of client terminals, includes a queue configured to receive the data from the plurality of client terminals, a first memory storing first instructions, and a first processor which is capable of executing the first instructions causing the reception service system to transmit a first transmission rule to a predetermined client terminal among the plurality of client terminals in a case where an amount of data transmitted from the predetermined client terminal per unit time exceeds a predetermined value, and the plurality of client terminals each includes a second memory storing second instructions, and a second processor which is capable of executing the second instructions causing each client terminal to transmit event data about an event that has occurred at that client terminal to the queue and store transmission rules transmitted from the reception service system, wherein the predetermined client terminal transmits less than all of the event data about the event that has occurred at the predetermined client terminal so that the amount of data transmitted per unit time to the queue does not exceed the predetermined value according to the stored first transmission rule.

Further features of the present disclosure will become apparent from the following description of exemplary embodiments with reference to the attached drawings.

BRIEF DESCRIPTION OF THE DRAWINGS

FIGS. 3A, 3B, 3C, 3D, 3E, 3F, 3G, and 3H are block diagrams each illustrating a software configuration.

FIG. 4 is a sequence diagram illustrating a process up to the data transmission from a client terminal to a stream reception server.

FIGS. 6A and 6B each illustrate an example of a collection filter.

FIGS. 7A and 7B each illustrate an example of event data.

FIG. 8 is a sequence diagram illustrating a process performed by a stream processing module.

FIGS. 9A and 9B are flowcharts illustrating a process performed by the stream processing module.

FIG. 12 is a flowchart illustrating a process performed by a stream processing module according to third exemplary embodiment.

DESCRIPTION OF THE EMBODIMENTS

Various exemplary embodiments of the present disclosure will be described below with reference to the drawings.

According to a first exemplary embodiment, an application is installed in each server on a network. Further, each application cooperates with a client terminal and provides various functions. An entity that provides such a function will be referred to as a "service", and providing a function to a client terminal will be referred to as "provision of a service". Further, a service that is provided by cooperation of a plurality of services from a plurality of servers and a plurality of applications will be referred to as an "integrated service".

Figure 1:
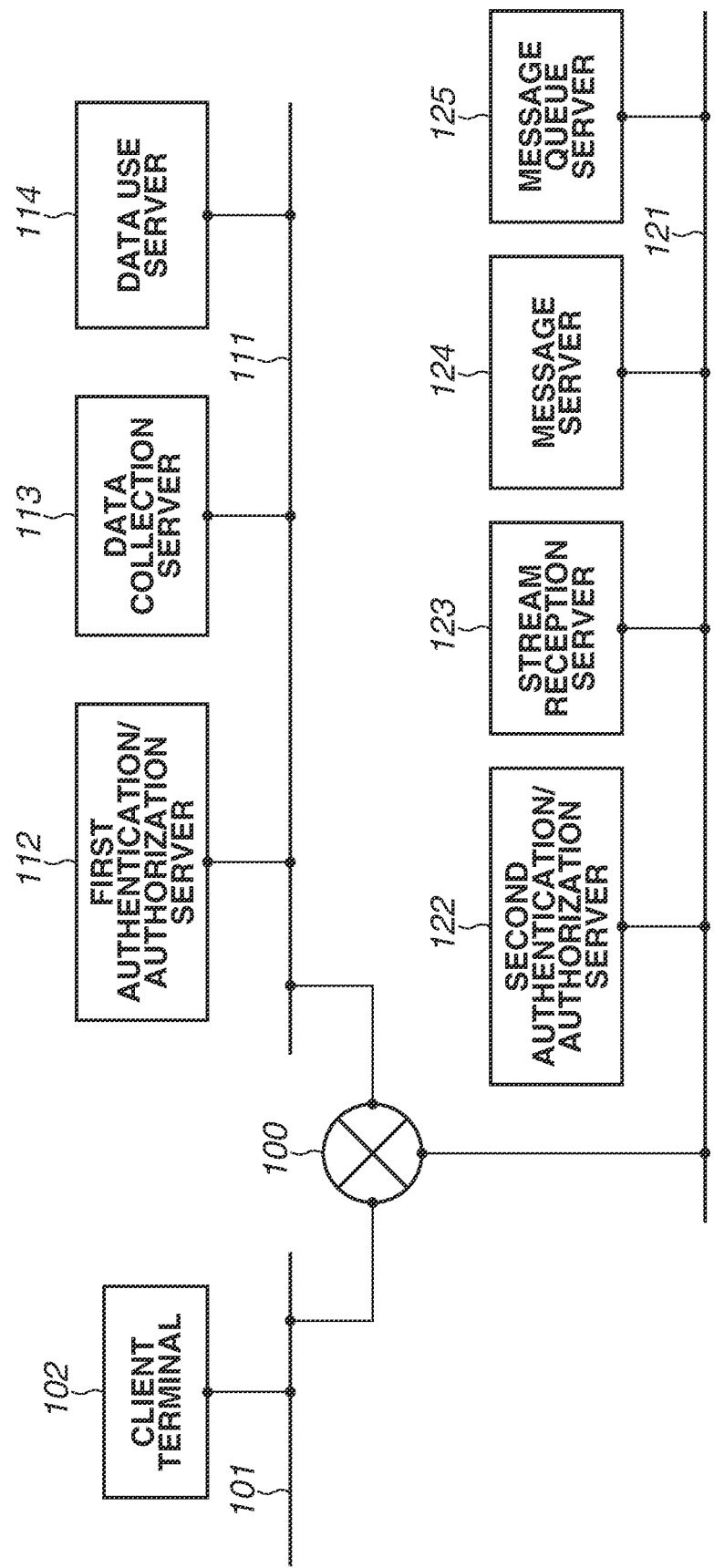
FIG. 1 is a block diagram illustrating an entire system.

FIG. 1 illustrates an entire configuration of a data collection infrastructure system, which is an information processing system according to the present exemplary embodiment. The information processing system according to the present exemplary embodiment includes a reception service system and a plurality of resource service systems. The reception service system receives data from a client terminal. The plurality of resource service systems processes received data and provides a service. The reception service system and each resource service system asynchronously process data. Examples of a services provided by the information processing system according to the present exemplary embodiment include a service that backs up data from a client terminal and a service that analyzes an operational status based on information about a sensor connected to the client terminal.

A network 100 is a wide area network (hereinafter, referred to as "WAN") that communicably connects components of the system.

Networks 101, 111, and 121 are local area networks (hereinafter, referred to as "LANs") that communicably connect components of the system.

A client terminal 102 is a device for using a service, such as a personal computer, a mobile terminal, or an image forming apparatus.

A first authentication/authorization server 112 is an authentication management server configured to realize authentication and authorization that are necessary for the client terminal 102 to use a service. The first authentication/authorization server 112 controls access to a data collection server 113 and a data use server 114 by the client terminal 102.

The data collection server 113 is a server configured to provide a service that collects data from the client terminal 102 and a service that notifies the data use server 114 of the collected data. In data collection, a stream reception server 123 described below is used. In data notification, a message server 124 described below is used.

The data use server 114 is a server configured to provide a service that uses data collected by the data collection server 113. For example, the data use server 114 provides a service that backs up data of the client terminal 102 and a service that analyses sensor information about a sensor connected to the client terminal 102. Data is acquired from the data collection server 113 by acquiring a message from a message queue server 125 described below.

The data use server 114 may be realized by an application that is executed using a serverless architecture. This is specifically a service that is provided by a cloud computing service and is known as an event-driven computing service that executes lightweight processing depending on an event that has occurred with respect to a specific computing resource. Examples include AWS Lambda, Google Cloud Functions, and Microsoft Azure Functions.

A second authentication/authorization server 122 is a server that is different from the first authentication/authorization server 112 and is configured to realize authentication and authorization with respect to the stream reception server 123, the message server 124, and the message queue server 125 and controls access.

The stream reception server 123 is a server configured to receive stream data and receives stream data transmitted by the client terminal 102.

The message server 124 is a server configured to transmit a notification of an event generated by a server of the system as a message. The message server 124 transmits a push notification of an event generated by a component of the system to a notification destination based on a registered notification destination and a notification condition.

The message queue server 125 is a server configured to store an event from an event transmission server of the system as a message and provide the message to a message reception server.

Especially, the stream reception server 123, the data collection server 113, and the message server 124 function as the reception service system according to the present exemplary embodiment. Further, the message queue server 125 and the data use server 114 function as the resource service system according to the present exemplary embodiment. While the client terminal 102 and the servers 112 to 114 and 122 to 125 are each illustrated as a single device in the present exemplary embodiment, the client terminal 102 and the servers 112 to 114 and 122 to 125 each can be configured of a plurality of devices.

Figure 2:
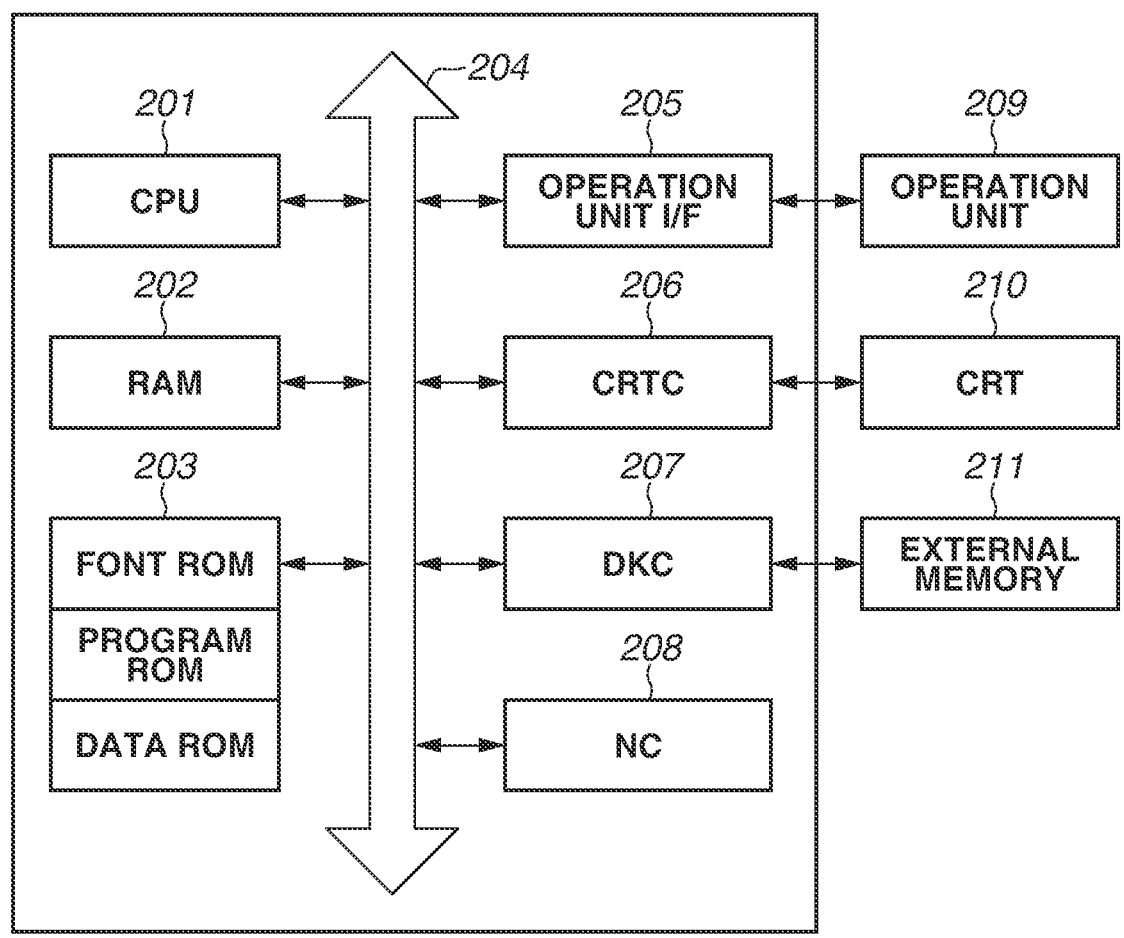
FIG. 2 is a block diagram illustrating a hardware configuration.

FIG. 2 illustrates a general hardware configuration of an information processing apparatus that configures each of the client terminal 102 and the servers 112 to 114 and 122 to 125 according to the present exemplary embodiment. In each of the servers 112 to 114 and 122 to 125, each hardware function of a computer illustrated in FIG. 2 is realized as application software by virtual machine software and behaves similarly to a physical hardware element.

A central processing unit (CPU) 201 executes a program, such as an operating system or an application, that is stored on a program read-only memory (ROM) of a ROM 203 or is loaded from an external memory 211, such as a hard disk, to a random access memory (RAM) 202. Further, the CPU 201 controls each block connected to a system bus 204. Processing of each sequence described below is realized by the program executed by the CPU 201.

The RAM 202 functions as a main memory and a work area of the CPU 201.

An operation unit interface (I/F) 205 controls input from an operation unit 209.

A cathode ray tube (CRT) controller (CRTC) 206 controls a display on a CRT display 210.

A disk controller (DKC) 207 controls data access to the external memory 211, such as a hard disk, storing various types of data.

A network controller 208 controls communication with the servers and other devices that are connected via the WAN 100 or the LAN 101, 102, or 103.

Hereinafter, unless otherwise specified, main subject of execution as hardware is the CPU 201, and main subject of execution software is an application program installed in the external memory 211.

FIGS. 3A to 3H illustrate a software configuration of the client terminal 102 and the servers 112 to 114 and 122 to 125 according to the present exemplary embodiment. Each module is executed to implement a function.

FIG. 3A is a block diagram illustrating a module configuration of the client terminal 102.

The client terminal 102 includes a token provider module 301, a data transmission module 302, an in-device module 303, a data storage module 304, and a collection filter reception module 305.

The token provider module 301 requests the first authentication/authorization server 112 to authenticate a client terminal and request an access token issuance and acquires the access token.

The data transmission module 302 uses the service provided by the data collection server 113 and transmits event data of the client terminal 102 to the stream reception server 123. In event data transmission, the data transmission module 302 transmits event data stored on the data storage module 304 described below to the stream reception server 123 following a description of a collection filter. Data contained in the event data will be described below with reference to FIGS. 7A and 7B.

The collection filter is a file that defines a transmission rule that specifies which event data among the event data stored on the data storage module 304 is to be transmitted at what frequency. Data held in the collection filter will be described below with reference to FIGS. 6A and 6B.

The in-device module 303 is a module of the client terminal 102 and stores event data on the data storage module 304 described below when various types of event data such as a device state occur. Examples of various types of event data include a start event and an end event when a job is executed and an abnormality event when a sensor detects an abnormality.

The data storage module 304 is a module configured to store event data from the in-device module 303. The collection filter reception module 305 is a module configured to receive the collection filter from the collection filter transmission module 323 described below.

The first authentication/authorization server 112 includes a first authentication/authorization module 311 and a first client management module 312.

The first authentication/authorization module 311 performs processing in response to an authentication request from the client terminal 102 and authorizes the authenticated client terminal 102.

The first client management module 312 manages an identification (ID) and a secret as authentication information about the client terminal 102 that is authenticated and authorized. Further, the first client management module 312 provides an application programming interface (API) configured to delete the managed authentication information about the client terminal 102 in response to a request from another server.

The data collection server 113 includes a token acquisition module 321 and a stream processing module 322.

The token acquisition module 321 is a module configured to acquire a token necessary for the data collection server 113 or the client terminal 102 to use services of the servers 123 to 125 from the second authentication/authorization server 122. Details thereof will be described below with reference to a sequence diagram illustrated in FIG. 4. The stream processing module 322 is a module configured to process stream data of the stream reception server 123. The stream processing module 322 notifies the data use server 114 of the content of the received stream data as an event using the message server 124 and the message queue server 125. Details thereof will be described below with reference to a sequence diagram illustrated in FIG. 8 and flowcharts illustrated in FIGS. 9A and 9B. A collection filter transmission module 323 is a module configured to transmit the collection filter to the client terminal 102.

The data use server 114 includes a token acquisition module 331 and a message processing module 332.

The token acquisition module 331 is a module configured to acquire a token necessary for the data use server 114 to use services of the servers 123 to 125 from the second authentication/authorization server 122. The message processing module 332 is a module configured to process a message stored on the message queue server 125. The message processing module 332 processes the message so that the message processing module 332 can receive an event notification from the stream processing module 322 and process the received event notification.

The second authentication/authorization server 122 includes a second authentication/authorization module 341 and a second client management module 342.

The second authentication/authorization module 341 performs processing in response to an authentication request from the client terminal 102 or the server 113 or 114 as a client and authorizes an authenticated client. The second client management module 342 manages an ID and a secret as authentication information about the servers 113 and 114 that are authenticated and authorized.

The stream reception server 123 includes a stream reception module 351. The stream reception module 351 provides a function of receiving stream information and storing the received stream information.

The message server 124 includes a message module 361 and a transmission management module 362. The message module 361 provides a function of transmitting and receiving a message. The transmission management module 362 provides a function of managing a transmission destination to which a message received by the message module 361 is to be transmitted.

The message queue server 125 includes a message queue module 371. The message queue module 371 provides a function of storing a received message in a queue.

The first authentication/authorization server 112 manages a client ID for uniquely identifying a client and a public key for authenticating the client as specified in a client management table of Table A. Further, the first authentication/authorization server 112 manages a device serial for uniquely identifying the client terminal 102.

The first authentication/authorization module 311 authenticates the client terminal 102 based on the client ID and the public key and identifies the device serial of the client terminal 102.

TABLE A

Client Management Table (First Authentication/authorization server 112)

| Client ID | Public Key | Device Serial |
|---|---|---|
| client1 | publickey1 | 123456789 |
| client2 | publickey2 | 987654321 |

The token provider module 301 of the client terminal 102 stores the client ID and the private key for the client terminal 102 as specified in a client management table of Table B.

TABLE B

Client Management Table (Client Terminal 102)

| Client ID | Private Key |
|---|---|
| client1 | privatekey1 |

While a description is given of the authentication using the client ID and an asymmetric key in the present exemplary embodiment, an authentication method is not particularly limited as described above, and any other methods such as an authentication method that uses a client ID and a secret can be employed.

Similarly, the second authentication/authorization server 122 manages a client ID for uniquely identifying a server and a secret for authenticating the server as specified in a client management table of Table C, and the second authentication/authorization module 341 authenticates a server based on the information.

TABLE C

Client Management Table (Second authentication/authorization Server 122)

| Client ID | Secret |
|---|---|
| clientA | secretA |
| clientB | secretB |

The token acquisition module 321 of the data collection server 113 and the token acquisition module 331 of the data use server 114 store a client ID and a secret of a client whose authentication is to be controlled as specified in a client management table of Table D.

TABLE D

Client Management Table (Data Collection Server 113, Data Use Server 114)

| Client ID | Secret |
|---|---|
| clientA | secretA |

FIG. 4 is a sequence diagram illustrating a normal process of transmitting an event from the client terminal 102 to the stream reception server 123.

In step S401, the data transmission module 302 of the client terminal 102 transmits a token issue request to the token provider module 301. The token provider module 301 generates an assertion using the client ID and the private key that are managed in Table B and generates a token issue request together with the assertion. In the present exemplary embodiment, the assertion is expected to be a JavaScript Object Notation (JSON) web token (hereinafter, referred to as "JWT") defined in Request for Comments (RFC) 7519, and the JWT contains information such as the client ID.

In step S402, the token provider module 301 transmits the assertion to the first authentication/authorization module 311 of the first authentication/authorization server 112.

The first authentication/authorization module 311 acquires the public key that corresponds to the client terminal 102 that transmits the assertion in step S402 from Table A and verifies a signature of the assertion. In a case where the verification is successful, the first authentication/authorization module 311 issues an access token μl and transmits a response. The token provider module 301 having received the response responds to the data transmission module 302 with the access token μl. The access token μl is needed for the client terminal 102 to access the data collection server 113 under access control by the first authentication/authorization server 112.

In the present exemplary embodiment, each access token is expected to be a JWT, and the JWT contains information such as client ID information, device serial information about the client terminal 102, and expiration period information about the token.

In step S403, the data transmission module 302 transmits a token issue request to the token acquisition module 321 of the data collection server 113 using the access token μl received as a response in step S402.

In step S404, the token acquisition module 321 verifies the access token μl contained in the received token issue request. The token acquisition module 321 holds a public key for verifying the JWT issued by the first authentication/authorization module 311 and verifies the JWT to authorize the client. In the verification of the JWT, the token acquisition module 321 verifies whether the signature of the JWT is valid using the public key and also verifies whether the expiration period of the JWT is not expired. Further, as a result of verifying the access token μl, client information can be acquired, and the client terminal 102, which is the access source, can be identified based on the device serial. Alternatively, the token acquisition module 321 may request the first authentication/authorization module 311 to verify the token and may acquire a verification result and the client information. The token acquisition module 321 having received the request processes the received request in steps S405 and S406.

In step S405, the token acquisition module 321 transmits a token issue request to the second authentication/authorization module 341 of the second authentication/authorization server 122. The token issue request is transmitted together with the client ID and the secret that are specified in Table D. In a case where the client ID and the secret that are managed in Table C match the client ID and the secret that are contained in the token issue request, the second authentication/authorization module 341 having received the token issue request issues an access token B as a respond. The access token B is for accessing the second authentication/authorization server 122.

In step S406, the token acquisition module 321 having acquired the access token B transmits an ID token issue request to the second authentication/authorization module 341. The token acquisition module 321 transmits the ID token issue request with the access token B and the client ID of the client terminal 102 that is acquired from the verification result in step S404. The second authentication/authorization module 341 issues an ID token for the received client ID.

The ID token is a token that proves that the client terminal 102 is successfully authenticated. In the present exemplary embodiment, the token acquisition module 321 verifies the access token μl in step S404 to thereby check an authentication of the client terminal 102. The second authentication/authorization module 341 establishes a trust relationship with the token acquisition module 321 by providing the client ID and the secret and trusts a result of authentication of the client terminal 102 by the token acquisition module 321. The second authentication/authorization module 341 issues the ID token based on the trust. Further, the ID token is expected to be a JWT, and the second authentication/authorization module 341 can verify the ID token by verifying the signature of the ID token.

In step S407, the data transmission module 302 of the client terminal 102 having received the ID token transmits a token issue request to the second authentication/authorization module 341 of the second authentication/authorization server 122. The request contains the ID token acquired in step S404. The second authentication/authorization module 341 having received the request verifies the ID token, and issues an access token C as a response. The access token C is for accessing the stream reception server 123.

In step S408, the data transmission module 302 of the client terminal 102 having received the access token C transmits data to the stream reception module 351 of the stream reception server 123. In this data transmission, the access tokens C and µl are transmitted. The stream reception module 351 having received a data transmission request verifies the access token C, and if there is no problem, the stream reception module 351 holds a pair of the access token µl and the data.

In this way, the client terminal 102 completes data transmission to the stream reception server 123.

The data transmission processing in step S408 in FIG. 4 described above will be described in detail below with reference to a flowchart in FIG. 5.

Figure 5:
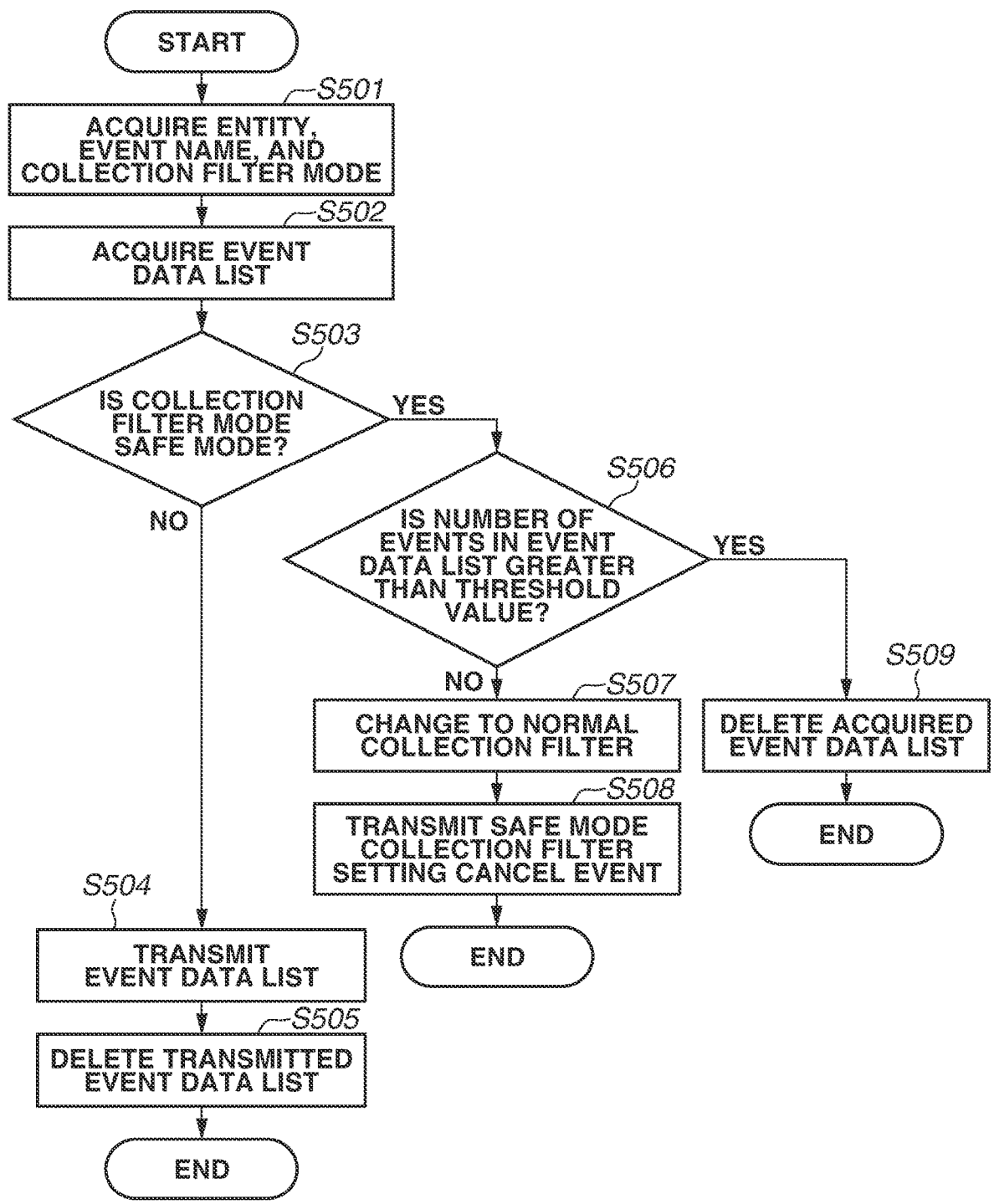
FIG. 5 is a flowchart illustrating a process of transmitting data from the client terminal to the stream reception server.

FIG. 5 is a flowchart illustrating a process of transmitting event data to the stream reception module 351 by the data transmission module 302 based on a collection filter 601.

The collection filter 601 is data as illustrated in FIGS. 6A and 6B. FIG. 6A illustrates an example of the collection filter 601 of a normal mode, and FIG. 6B illustrates an example of the collection filter 601 of a safe mode. The collection filter 601 describes an entity 602 where an event occurs, an event name 603 of the event that has occurred, a transmission timing 604 of transmission to the stream reception module 351, and a collection filter mode 605. The collection filter mode 605 specifies whether the mode is the normal mode or the safe mode.

Further, in the case where the collection filter mode 605 is the safe mode as in FIG. 6B, a threshold value 606 is also described.

The example in FIG. 6A illustrates a filter setting in which event data is transmitted every ten minutes in a case where a hard disk drive (HDD) sensor error occurs, and the collection filter mode 605 is set to the normal mode.

The example in FIG. 6B illustrates a filter setting in which the collection filter mode 605 for HDD sensor errors is set to the safe mode, checking is performed every sixty minutes, and event data is transmitted in a case where the number of pieces of event data is not greater than the threshold value of five.

The flowchart illustrated in FIG. 5 is executed at a timing when the data transmission module 302 transmits event data according to the descriptions in the collection filter 601. At the time of execution, the entity 602, the event name 603, and the collection filter mode 605 of the collection filter 601 to be executed as arguments are passed.

In step S501, the data transmission module 302 acquires the entity, the event name, and the collection filter mode that are passed as arguments.

In step S502, the data transmission module 302 acquires an event data list that matches the entity and the event name that are acquired in step S501 from event data 701 stored in the data storage module 304. The event data 701 is data as illustrated in FIG. 7A, and an event ID 702 and a device serial 703 are described in the event data 701. The event ID 702 uniquely identifies an event in the client terminal 102, and the device serial 703 uniquely identifies the client terminal 102. Furthermore, an entity 704 where the event occurs, an event name 705 of the event that has occurred, and occurrence time/date 706 are also described in the event data 701. In step S502, an event data list of event data with the entity 704 and the event name 705 that respectively match the entity and the event name that are acquired in step S501 is acquired as data to be transmitted.

In step S503, the data transmission module 302 checks whether a value of the collection filter mode 605 acquired in step S501 is "safe mode". In a case where the value is "safe mode" (YES in step S503), the processing proceeds to step S506. On the other hand, in a case where the value is not "safe mode" (NO in step S503), the processing proceeds to step S504.

In step S504, the data transmission module 302 transmits the event data list acquired in step S502 together with the access tokens C and µl to the stream reception module 351.

In step S505, the data transmission module 302 deletes the event data list transmitted in step S504 from the data storage module 304.

In step S506, the data transmission module 302 checks whether the number of pieces of event data in the event data list acquired in step S502 is greater than a predetermined value specified by the threshold value 606 in the collection filter 601. The predetermined value herein is determined based on the data amount that can be received per unit time by the stream reception module 351. In a case where the number of pieces of event data is greater than the predetermined value (YES in step S506), the processing proceeds to step S509. On the other hand, in a case where the number of pieces of event data is not greater than the predetermined value (NO in step S506), the processing proceeds to step S507. Alternatively, not the number of pieces of event data but an event data size may be used as a data amount that is used in the determination in step S506.

In step S507, since the number of pieces of event data is not greater than the threshold value, the data transmission module 302 determines that the client terminal 102 is stable. Then, the data transmission module 302 changes the collection filter from the collection filter of the safe mode to the collection filter of the normal mode that is saved in the external memory 211 of the client terminal 102.

In step S508, the data transmission module 302 generates a new safe mode collection filter setting cancel event for notification of the change from the collection filter of the safe mode to the collection filter of the normal mode. Then, the data transmission module 302 transmits the safe mode collection filter setting cancel event together with the access tokens C and µl to the stream reception module 351.

In the present exemplary embodiment, the collection filter setting cancel event is addition of an item with the description "release" to a value of a safe mode 707 as illustrated in FIG. 7B.

In the present exemplary embodiment, the method in which the client terminal 102 changes the collection filter to the normal collection filter in step S507 is described. Alternatively, the client terminal 102 may notify the stream reception server 123 that the number of events that has occurred per unit time is not greater than the threshold value, and the data collection server 113 may request the client terminal 102 to change the collection filter to the normal collection filter.

In step S509, since the number of pieces of event data is greater than the threshold value, the data transmission module 302 determines that the client terminal 102 is not stable, and the data transmission module 302 does not transmit the event data list acquired in step S502 and deletes the event data list. While the event data that is not to be transmitted is deleted due to the limited storage capacity of the client terminal 102 in the present exemplary embodiment, the event data that is not to be transmitted does not necessarily have to be deleted. Alternatively, instead of transmitting no data in the event data list and deleting all the data, the data transmission module 302 may delete some of the data without transmitting and transmit the remaining data to the stream reception module 351. In this case, some of the data is deleted so that the number of pieces of event data transmitted to the stream reception module 351 does not exceed the threshold value. This produces an advantage that the load on the stream reception module 351 is reduced.

According to the above-described flowchart illustrated in FIG. 5, when the collection filter is set to the safe mode, if the number of pieces of event data is greater than the threshold value, no event data is transmitted so that the load on the stream reception module 351 is reduced. Further, in a case where the number of pieces of event data is not greater than the threshold value, the collection filter is returned to the collection filter of the normal mode so that data transmission is automatically resumed when the client terminal 102 becomes stable.

Table E shows an example of data that is stored on the stream reception server 123 when the processes illustrated in FIGS. 4 and 5 are completed. An ID that uniquely identifies data, data reception time/date, received access token, device serial, entity, event name, and information about whether it is a safe mode cancel event are managed as a single record on the stream reception server 123. The data is sorted in order of reception time/date and stored in the stream data storage table.

TABLE E

Stream Data Storage Table

| ID | Time/Date of Reception | Access Token | Device Serial | Entity | Event Name | Safe Mode |
|----|------------------------|--------------|---------------|--------|------------|-----------|
| 1 | 2018 Aug. 31 00:00:01 | A1 | AAA12345 | HDD | sensor Error | |
| 2 | 2018 Aug. 31 00:00:02 | A1 | AAA12345 | HDD | sensor Error | |
| 3 | 2018 Aug. 31 00:00:03 | A1 | AAA12345 | HDD | sensor Error | |
| 4 | 2018 Aug. 31 00:00:05 | A1 | AAA12345 | Print | jobStart | |
| 5 | 2018 Aug. 31 00:00:06 | A1 | AAA12345 | HDD | sensor Error | |
| 6 | 2018 Sep. 5 13:04:00 | A1 | AAA12345 | HDD | sensor Error | Cancel |

A process that is performed by the stream processing module 322 of the data collection server 113 will be described below with reference to FIGS. 8, 9A, and 9B.

Figure 9A:
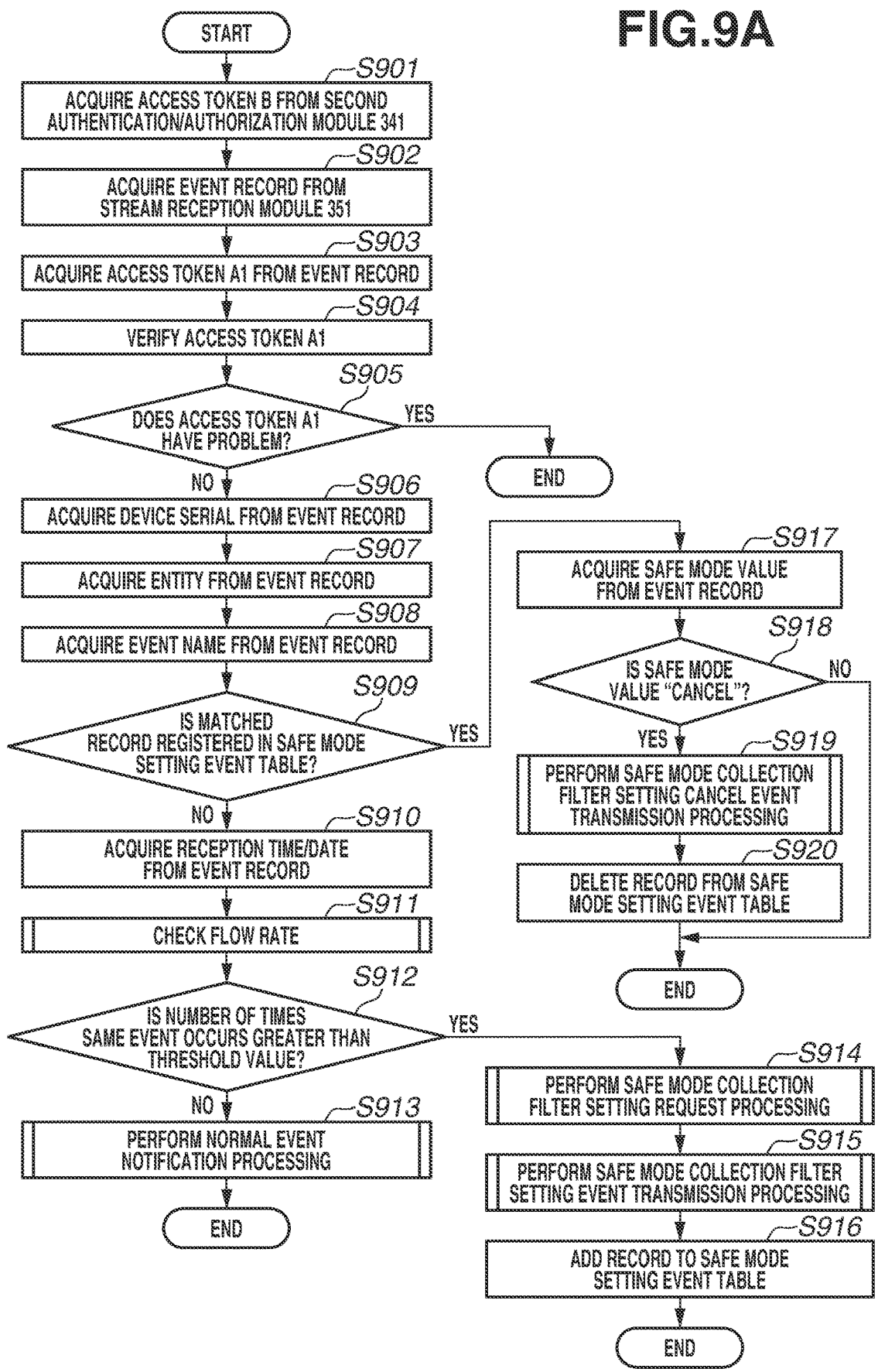

FIGS. 8, 9A, and 9B are a sequence diagram and flowcharts each illustrating a process of processing provided by the stream processing module 322 of the data collection server 113. Details of the processing will be described with reference to the flowcharts in FIGS. 9A and 9B, and cooperation with other modules will be described with reference to the sequence diagram illustrated in FIG. 8. The processing is periodically executed by the data collection server 113.

In step S901 (step S801), the stream processing module 322 transmits a token issue request to the second authentication/authorization module 341. This processing is similar to that in step S405 in FIG. 5. The second authentication/authorization module 341 receives the token issue request, issues the access token B necessary for access to the stream reception server 123 and the message server 124, as a response to the stream processing module 322 with the access token B.

In step S902 (step S802), the stream processing module 322 transmits a record acquisition request and the access token B to the stream reception module 351 of the stream reception server 123. The stream reception module 351 having received the record acquisition request verifies the access token B, and if there is no problem, the stream reception module 351 responds to the stream processing module 322 with the records managed on the stream data storage table of Table E in chronological order of reception data. Each received record will be referred to as "migration event record".

In step S903, the stream processing module 322 acquires the access token µl from the event records received in step S902. In step S904, the stream processing module 322 verifies the access token µl acquired in step S903. In the verification, the signature and expiration period of the access token µl are checked. In step S905, if the stream processing module 322 finds no problem in the verification in step S904 (NO in step S905), the processing proceeds to step S906. On the other hand, if the stream processing module 322 finds a problem (YES in step S905), the process is ended.

In step S906, the stream processing module 322 acquires the device serial from the event records acquired in step S902. In step S907, the stream processing module 322 acquires the entity from the event records acquired in step S902. In step S908, the stream processing module 322 acquires the event name from the event records acquired in step S902.

In step S909, the stream processing module 322 checks whether data that matches the device serial, the entity, and the event name that are acquired in steps S906 to S908 is registered in a safe mode setting event table. The safe mode setting event table is stored on the data collection server 113. In a case where the matched data is registered (YES in step S909), the processing proceeds to step S917. On the other hand, in a case where the matched data is not registered (NO in step S909), the processing proceeds to step S910.

The safe mode setting event table is a table that manages information about whether the client terminal 102 has issued a safe mode collection filter setting request, and an example thereof is illustrated in Table F.

TABLE F

Safe Mode Setting Event Table (Data Collection Server 113)

| Device Serial | Entity | Event Name |
|---------------|--------|------------|
| AAA10000 | HDD | sensorError |
| AAA12345 | HDD | sensorError |
| BBB23541 | HDD | sensorError |

In step S910, the stream processing module 322 acquires the reception time/date from the event data acquired in step S902.

In step S911, the stream processing module 322 performs flow rate checking to check whether the same event occurs in large amount at a specific client terminal 102. An example of the flow rate checking will be described with reference to the flowchart illustrated in FIG. 9B.

In step S931, the stream processing module 322 adds the device serial, entity, event name, and reception time/date that are acquired in steps S906 to S908 and S910 as a single record to an event history table.

The event history table is a table that manages a history of a previously-processed event, and an example thereof is illustrated in Table G. Each record in the event history table is periodically deleted when one hour has passed after the reception time/date of the record.

TABLE G

Event History Table (Data Collection Server 113)

| Device Serial | Entity | Event Name | Time/Date of Reception |
|---|---|---|---|
| AAA12345 | HDD | sensor Error | 2018 Aug. 31 00:00:01 |
| AAA12345 | HDD | sensor Error | 2018 Aug. 31 00:00:02 |
| AAA12345 | HDD | sensor Error | 2018 Aug. 31 00:00:03 |

In step S932, the stream processing module 322 acquires an event history list that matches the device serial, entity, and event name that are acquired in steps S906 to S908 from the event history table of Table G.

In step S933, the stream processing module 322 checks whether the number of events that has occurred per unit time in the event history list acquired in step S932 is greater than a threshold value. For example, whether the same event occurs more than 100 times within one minute is checked. The threshold value at this time is determined based on the amount of data that can be received per unit time by the stream reception module 351. If the number of events that has occurred per unit time in the event history list acquired in step S932 is greater than the threshold value (YES in step S933), the processing proceeds to step S934. In step S934, a return value that indicates that the number of events is greater than the threshold value is returned. On the other hand, if the number of events that has occurred per unit time in the event history list acquired in step S932 is not greater than the threshold value (NO in step S933), the processing proceeds to step S935. In step S935, a return value that indicates that the number of events is not greater than the threshold value is returned.

Referring back FIG. 9A, in step S912, in a case where the stream processing module 322 determines that the number of events is greater than the threshold value as a result of step S911 (YES in step S912), the processing proceeds to step S914. On the other hand, in a case where the stream processing module 322 determines that the number of events is not greater than the threshold value (NO in step S912), the processing proceeds to step S913.

In step S913, the stream processing module 322 determines that the same event does not occur in large amount at a specific client terminal 102, and the stream processing module 322 performs normal event notification processing on the data use server 114.

Specifically, in step S803, the stream processing module 322 transmits the event that has occurred with respect to the message server 124 and the access token B, to the message server 124. In step S804, the message module 361 of the message server 124 verifies an access token B that is received in step S803, and if there is no problem, the message module 361 transmits the event to the message queue server 125 based on the setting of the transmission management module 362, and the process is ended.

Table H illustrates an example of a transmission management data stored in the transmission management module 362.

TABLE H

Transmission Management Data Table (Message Server 124)

| Topic ID | Notification Destination Client ID |
|---|---|
| HDD | client1 |
| Print | client1 |

In the transmission management data, a topic ID that uniquely identifies a storage location of a message and a client ID that is a notification destination of the message are stored in association with each other as a single record.

Further, Table I illustrates an example of data stored in the message module 361.

TABLE I

Message Table (Message Server 124)

| Topic ID | Message |
|---|---|
| HDD | sensorError |

In the message module 361, a received event message and a topic ID corresponding to the received event message are stored in association with each other as a single record in the message table.

Referring back to FIGS. 8, 9A, and 9B, in step S914 (step S805), the stream processing module 322 determines that the same event occurs in large amount at a specific client terminal 102. Then, the stream processing module 322 requests the collection filter transmission module 323 to set the client terminal 102 to the collection filter of the safe mode.

In step S806, the collection filter transmission module 323 transmits the collection filter of the safe mode to the collection filter reception module 305 of the client terminal 102. The collection filter of the safe mode is the collection filter 601 as illustrated in FIG. 6B. The collection filter transmission module 323 transmits the collection filter in which the collection filter mode 605 is set to the safe mode and values are set to the transmission timing 604 and the threshold value 606 with respect to the entity and the event name that are acquired in step S802.

In the present exemplary embodiment, the collection filter transmission module 323 transmits the collection filter to the collection filter reception module 305 as described above. In another embodiment, the collection filter transmission module 323 issues a collection filter setting instruction to a state management server (not illustrated) that manages client terminal state information. Then, the client terminal 102 and the client terminal state information managed by the state management server are synchronized so that a preset collection filter is transmitted to the collection filter reception module 305. In this way, a change to the collection filter setting is applied to the client terminal 102. For example, in AWS IoT, which is a service provided by Amazon Web Service (hereinafter, referred to as "AWS"), a Device Shadow service can be used to realize the above-described processing.

While the fixed values "60 minutes" and "5" are respectively set to the transmission timing 604 and the threshold value in the present exemplary embodiment, the values may be changed depending on the entity and the event name.

In step S807, the collection filter reception module 305 sets the collection filter 601 of the safe mode that is received in step S806 to the data transmission module 302. At this time, the previously-used collection filter is saved in the external memory 211 so that the saved collection filter can be used again when the behavior of the client terminal 102 becomes stable.

In step S915, the stream processing module 322 performs safe mode collection filter setting event transmission processing to notify the data use server 114 that the same event occurs in large amount at a specific client terminal 102. This processing is performed so that, for example, information that indicates that a target device is in an abnormal state is displayed on a user interface (UI) screen provided to the client terminal 102 by the data use server 114.

Specifically, in step S808, the stream processing module 322 transmits a safe mode collection filter setting event indicating that the collection filter of the safe mode is set to the message module 361 of the message server 124. This is performed to notify the data use server 114 that the same event occurs in large amount at a specific client terminal 102. In an example of the safe mode collection filter setting event, in a case where a normal event message is "sensorError", a message of the safe mode collection filter setting event is "SAFEMODE_sensorError". In this way, the stream processing module 322 can provide the notification that the sensorError event of the HDD is set to the safe mode.

In step S809, the message module 361 of the message server 124 transmits the event received in step S811 to the message queue server 125 based on the setting of the transmission management module 362.

In step S916, the stream processing module 322 registers the device serial, entity, and event name from the event records acquired in step S802 as a record in the safe mode setting event table of Table F, and the process is ended.

The processing in Step S917 is the processing that is performed in a case where data is registered in the safe mode setting event table in step S909. In step S917, the stream processing module 322 acquires the safe mode value of the event records acquired in step S902.

In step S918, the stream processing module 322 checks whether the safe mode value acquired in step S917 is "cancel". In a case where the acquired safe mode value is "cancel" (YES in step S918), the processing proceeds to step S919. On the other hand, in a case where the acquired safe mode value is not "cancel" (NO in step S918), the process is ended.

In step S919, the stream processing module 322 performs safe mode collection filter setting cancel event transmission processing to transmit a safe mode collection filter setting cancel event to notify the data use server 114 that the safe mode is canceled.

Specifically, in step S810, the stream processing module 322 transmits a safe mode collection filter cancel event to the message module 361 of the message server 124.

In an example of the safe mode collection filter cancel event, in a case where a normal event message is "sensorError", a message of the safe mode collection filter setting event is "BASICMODE_sensorError". In this way, a notification that the sensorError event of the HDD is set to the normal mode is issued.

In step S811, the message module 361 of the message server 124 transmits the event received in step S810 to the message queue server 125 based on the setting of the transmission management module 362.

In step S920, the stream processing module 322 deletes the safe mode setting event record acquired in step S909, and the process is ended.

According to the sequence diagram illustrated in FIG. 8 and the flowcharts illustrated in FIGS. 9A and 9B, in a case where an unexpectedly large amount of data is transmitted from the client terminal 102, the collection filter of the safe mode is set to the client terminal 102. As a result of setting the collection filter, the client terminal 102 reduces the amount of data to be transmitted to the reception service system. Further, in a case where the reception service system receives a collection filter setting cancel event that indicates that the number of data transmissions from the client terminal 102 is not greater than the threshold value, a notification that the safe mode is canceled is issued to the data use server 114, which is a subscriber.

Thus, even in a case where an excessive amount of data is transmitted from a client terminal, the service is continuously provided without stopping the function of the data collection server 113. In other words, a delay in processing of data of other client terminals in the data collection server 113 can be avoided. Further, a notification of a current situation is issued to the subscriber so that the user is notified of the state.

According to the first exemplary embodiment, the client terminal 102 to which the collection filter 601 of the safe mode is set does not transmit data until the frequency of event data transmission becomes lower than or equal to the threshold value due to the collection filter setting.

However, there may be a case where the collection filter of the safe mode is not received depending on a state of an error of the client terminal 102. This state is taken into consideration in a second exemplary embodiment.

Figure 10:
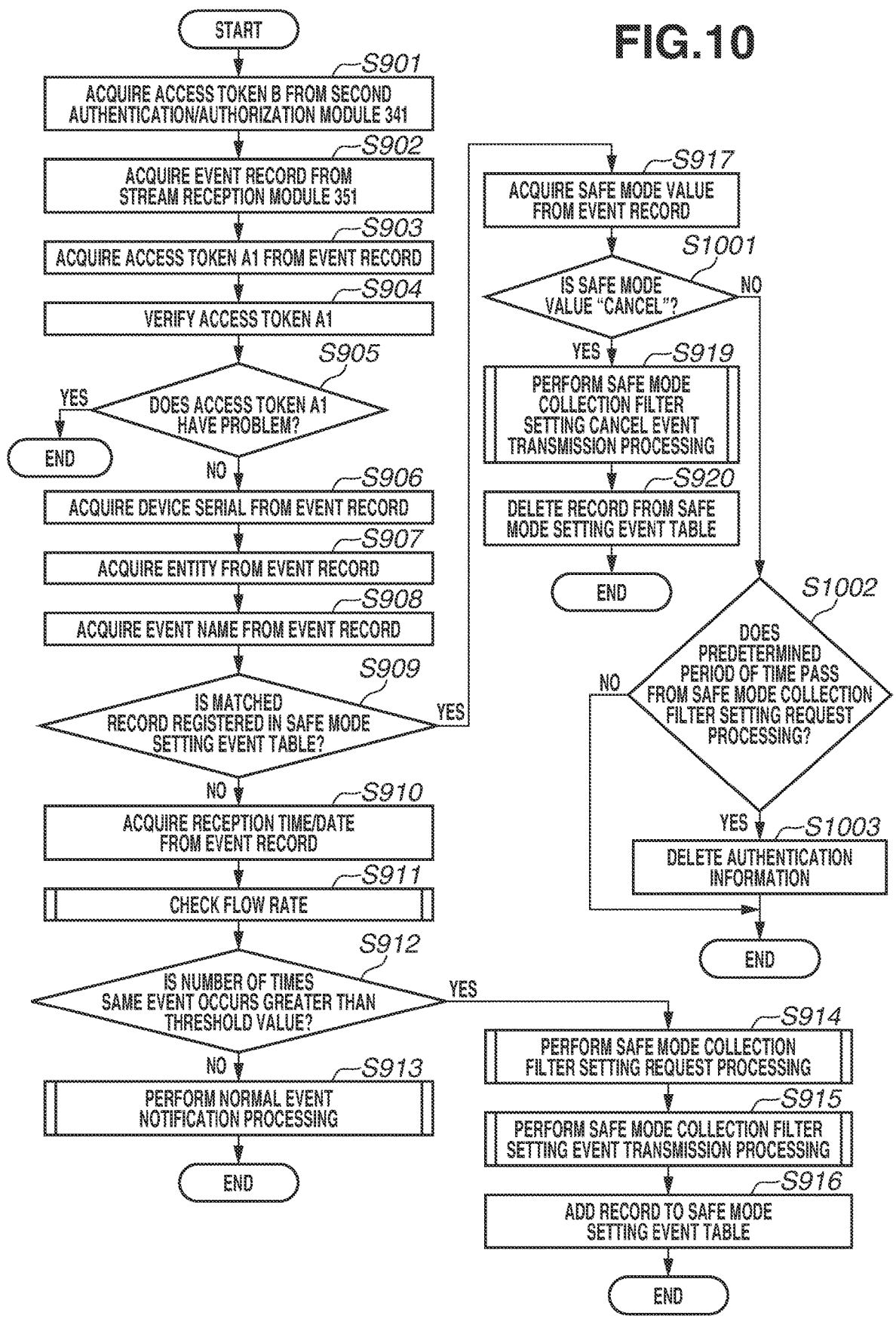
FIG. 10 is a flowchart illustrating a process performed by a stream processing module according to a second exemplary embodiment.

FIG. 10 is a flowchart illustrating a process that is performed by the stream processing module 322 of the data collection server 113 according to the second exemplary embodiment.

The processing performed in steps S901 to S917, S919, and S920 are similar to that in FIG. 9 described above.

In step S1001, the stream processing module 322 checks whether the safe mode value acquired in step S917 is "cancel". In a case where the acquired safe mode value is "cancel" (YES in step S1001), the processing proceeds to step S919. On the other hand, in a case where the acquired safe mode value is not "cancel" (NO in step S1001), the processing proceeds to step S1002.

In step S1002, the stream processing module 322 checks whether a predetermined period of time has passed from the safe mode collection filter setting request processing requested in step S914. In a case where the predetermined period of time has passed (YES in step S1002), the processing proceeds to step S1003. On the other hand, in a case where the predetermined period of time has not passed (NO in step S1002), the process is ended. The predetermined period of time is the fixed value "10 minutes" in the present exemplary embodiment.

In step S1003, the stream processing module 322 requests the first client management module 312 of the first authentication/authorization server 112 to delete authentication information about the device serial of the client terminal 102 that is acquired in step S906.

According to the second exemplary embodiment described above, in a case where the frequency of data transmission from the client terminal 102 to which a safe mode collection filter setting request is issued does not decrease even after the predetermined period of time has passed, authentication information about the client terminal is deleted. As a result, the client terminal 102 cannot be authenticated when attempting to acquire the access token in step S402, so that the client terminal 102 cannot reach the processing of accessing the data collection server 113. In other words, the client terminal 102 cannot transmit data to the reception service so that the load on the data collection server 113 is reduced.

According to the first and second exemplary embodiments, access to the data collection server 113 is received as much as possible within a level that is allowable by the system.

However, when the load on a client network is taken into consideration, there may be a demand for setting the collection filter of the safe mode at the device end even if the number of data transmissions is less than that described in the first and second exemplary embodiments in a case where transmission of event data that is considered to be an error is detected.

According to a third exemplary embodiment, the above-described case is taken into consideration and the collection filter is changed at the client terminal end.

Figure 11:
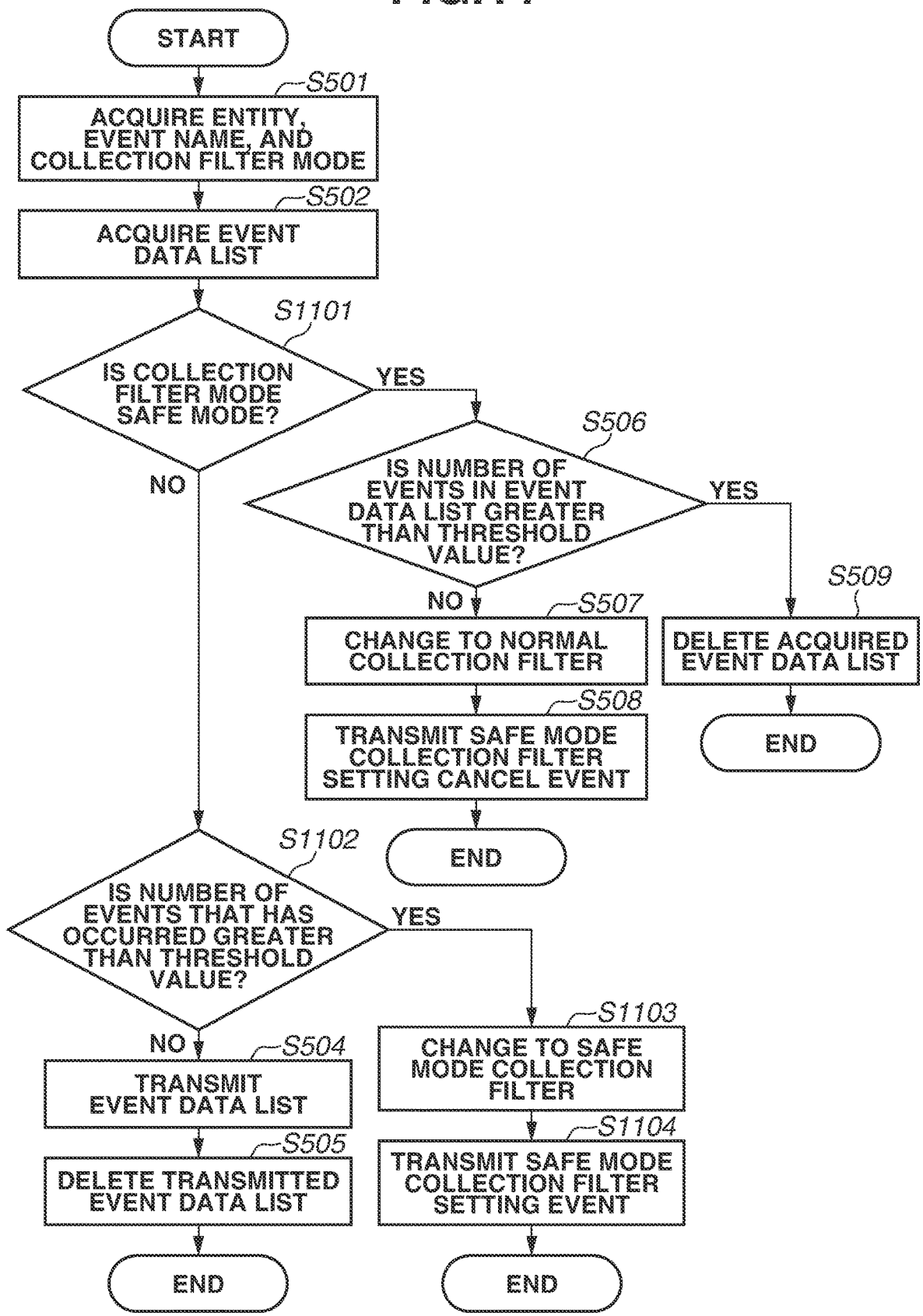
FIG. 11 is a flowchart illustrating a process of transmitting data from a client terminal to a stream reception server according to a third exemplary embodiment.

FIG. 11 is a flowchart illustrating a process that is performed by the data transmission module 302 and in which event data is transmitted to the stream reception module 351 based on the collection filter 601 according to the third exemplary embodiment.

The processing performed in steps S501, S502, and S504 to S509 is similar to that in FIG. 5 described above.

In step S1101, the data transmission module 302 checks whether the value of the collection filter mode 605 that is acquired in step S501 is "safe mode". In a case where the acquired value is "safe mode" (YES in step S1101), the processing proceeds to step S506. On the other hand, in a case where the acquired value is not "safe mode" (NO in step S1101), the processing proceeds to step S1102.

In step S1102, the data transmission module 302 checks whether the number of events in the event data list acquired in step S502 is greater than a threshold value for changing to the safe mode. While the threshold value for changing to the safe mode is fixed to 10000 in the present exemplary embodiment, the threshold value can be set for each piece of event data. In a case where the number of events in the acquired event data list is greater than the threshold value (YES in step S1102), the processing proceeds to step S1103. On the other hand, in a case where the number of events in the acquired event data list is not greater than the threshold value (NO in step S1102), the processing proceeds to step S504.

In step S1103, the data transmission module 302 sets the safe mode collection filter to change to the safe mode. In the present exemplary embodiment, the safe mode collection filter and the normal collection filter are stored in advance in the client terminal 102.

In step S1104, the data transmission module 302 generates a new safe mode collection filter setting event for notification of the change from the normal mode collection filter to the safe mode collection filter. The data transmission module 302 transmits the generated safe mode collection filter setting event together with the access tokens C and μl to the stream reception module 351.

In the present exemplary embodiment, the collection filter setting event is addition of an item with the description "set" to the value of the safe mode 707 illustrated in FIG. 7B.

Further, the value "set" is added to the value of the safe mode 707 in the stream data storage table having received the collection filter setting event.

According to the flowchart illustrated in FIG. 11, if an abnormality is detected by the client terminal 102, the collection filter is automatically changed to the safe mode collection filter, and a notification of the change is transmitted to the data collection server 113.

FIG. 12 is a flowchart illustrating a process that is performed by the stream processing module 322 of the data collection server 113 according to the third exemplary embodiment.

The processing performed in steps S901 to S908, S910 to S917, S919, and S920 is similar to that in FIG. 9 described above. Further, the processing performed in steps S1001 to S1003 are similar to that in FIG. 10 described above.

In step S1201, the stream processing module 322 checks whether data that matches the device serial, entity, and event name that are acquired in steps S906 to S908 is registered in the safe mode setting event table. The safe mode setting event table is stored in the data collection server 113. In a case where matched data is registered (YES in step S1201), the processing proceeds to step S917. On the other hand, in a case where the matched data is not registered (NO in step S1201), the processing proceeds to step S1202.

In step S1202, the stream processing module 322 acquires the safe mode value of the event records acquired in step S902.

In step S1203, the stream processing module 322 checks whether the safe mode value acquired in step S1202 is "set". In a case where the acquired safe mode value is "set" (YES in step S1203), the processing proceeds to step S915. On the other hand, in a case where the acquired safe mode value is not "set" (NO in step S1203), the processing proceeds to step S910.

According to the flowchart illustrated in FIG. 12, if the data collection server 113 receives a notification that the safe mode collection filter is set at the client terminal end, the data collection server 113 can notify the data use server 114 of the received notification.

According to the third exemplary embodiment described above, in a case where an error is detected at the client terminal 102 end, the safe mode collection filter is applied thereto so that the number of event transmissions is reduced. In this way, a transmission function based on data collection that takes the network load in a client environment into consideration is provided. Further, a notification of the change to the safe mode is transmitted to the data collection server 113 so that the data use server 114 is also notified of the change to the safe mode collection filter.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-042587, filed Mar. 8, 2019, which is hereby incorporated by reference herein in its entirety.

What is claimed is:

1. A system comprising a plurality of client terminals and a reception service system configured to receive data from the plurality of client terminals, the reception service system comprising:
   a queue configured to receive the data from the plurality of client terminals;
   one or more first memories storing first instructions; and
   one or more first processors executing the first instructions to:
   transmit a first transmission rule to a predetermined client terminal among the plurality of client terminals in a case where an amount of data transmitted from the predetermined client terminal per unit time exceeds a predetermined value; and
   request an authentication management server to delete authentication information about the predetermined client terminal in a case where a predetermined period of time has passed from when the first transmission rule is transmitted to the predetermined client terminal and an amount of data transmitted from the predetermined client terminal per unit time exceeds the predetermined value, wherein the authentication management server manages authentication information about the plurality of client terminals, and
   the plurality of client terminals each comprising:
   one or more second memories storing second instructions; and
   one or more second processors executing the second instructions to:
   acquire authentication information from the authentication management server;
   transmit event data about an event that has occurred at that client terminal to the queue by using the acquired authentication information; and
   store the first transmission rule transmitted from the reception service system,
   wherein the predetermined client terminal transmits less than all of the event data about the event that has occurred at the predetermined client terminal so that the amount of data transmitted per unit time to the queue does not exceed the predetermined value based on the stored first transmission rule.

2. The system according to claim 1, wherein the predetermined client terminal transmits none of the event data to the queue according to the stored first transmission rule.

3. The system according to claim 1,
   wherein each client terminal is further caused to:
   determine whether the amount of event data about the event that has occurred at that client terminal is greater than a predetermined threshold value that is based on an amount of data receivable per unit time by the queue; and
   transmit a first notification to the reception service system in a case where the amount of the event data is less than or equal to the predetermined threshold value,
   receive from the reception service system a second transmission rule different from the first transmission rule,
   store the transmitted second transmission rule, and
   wherein the predetermined client terminal transmits all the event data about the event that has occurred at the predetermined client terminal, in a case where the stored first transmission rule is changed to the second transmission rule, to the queue according to the second transmission rule.

4. The system according to claim 1, further comprising a resource service system configured to process data from the plurality of client terminals, that is received from the reception service system,
   wherein the reception service system notifies the resource service system of a first event indicating that the first transmission rule is transmitted to the predetermined client terminal.

5. The system according to claim 3,
   wherein the predetermined client terminal transmits a second event, indicating that the stored first transmission rule is changed to the second transmission rule, to the queue, in a case where the stored first transmission rule is changed to the second transmission rule, and
   wherein the resource service system is notified of the second event, in a case where the queue receives the second event.

6. The system according to claim 1, further comprising a state management server configured to manage state information about each of the plurality of client terminals,
   wherein the state information about the predetermined client terminal that is managed by the state management server is changed so that the first transmission rule is transmitted to the predetermined client terminal, in a case where the amount of data transmitted from the predetermined client terminal per unit time exceeds the predetermined value.

7. A method of controlling a system including a plurality of client terminals and a reception service system configured to receive data from the plurality of client terminals, the method comprising:
   managing authentication information, by an authentication management server, about the plurality of client terminals;
   acquiring, by a client terminal among the plurality of client terminals, the authentication information;
   transmitting data from the client terminal to the reception service system, about an event that has occurred at the client terminal, using the acquired authentication information;
   transmitting from the reception service, a transmission rule to the client terminal in a case where an amount of data transmitted from the client terminal to the reception service system per unit time exceeds a predetermined value;
   storing the transmitted transmission rule in the client terminal, wherein at least some of the data about the event that has occurred at the client terminal is not transmitted to the reception service system so that the amount of data transmitted per unit time does not exceed the predetermined value according to the stored transmission rule; and requesting the authentication management server to delete authentication information about the client terminal in a case where a predetermined period of time has passed from when the transmission rule is transmitted to the client terminal and an amount of data transmitted from the client terminal per unit time exceeds the predetermined value.

* * * * *